Figure 1:
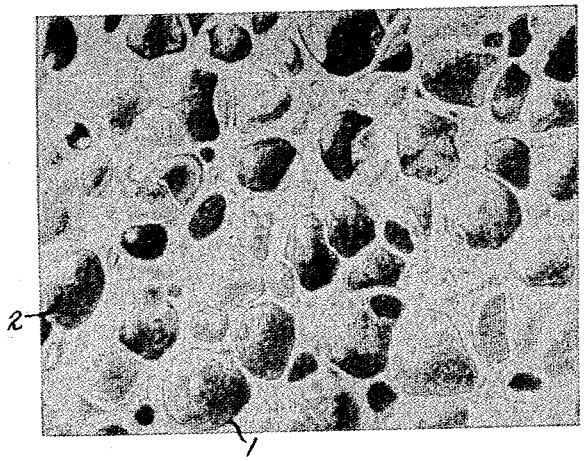

Inventors:
Herbert Lindemann and
Ernst Stirnemann
By: Michael S. Struker
agt.

United States Patent Office 2,795,008
Patented June 11, 1957

2,795,008

METHOD OF PRODUCING CELLULAR RESIN BODIES

Herbert Lindemann, Sins, and Ernst Stirnemann, Basel, Switzerland, assignors to Lonza Elektrizitaetswerke und Chemische Fabriken Aktiengesellschaft, Gampel, Wallis, Switzerland, a company of Switzerland Original application November 4, 1952, Serial No. 318,576, now Patent No. 2,746,088, dated May 22, 1956. Divided and this application February 27, 1956, Serial No. 568,114

Claims priority, application Switzerland November 10, 1951

10 Claims. (Cl. 18—48)

The present invention relates to a method of producing cellular thermoplastic resin bodies and more particularly to the production of closed-cell cellular thermoplastic resin bodies having wrinkled cell walls and having a high resistance to breaking upon bending.

The present application is a division of our copending application Serial Number 318,576, filed November 4, 1952, now Patent No. 2,746,088, for "Cellular Thermoplastic Bodies."

It is an object of the present invention to provide a process of producing closed-cell cellular thermoplastic resin bodies wherein the cell walls thereof are wrinkled or have folds therein.

It is a further object of the present invention to provide a process of producing closed-cell cellular thermoplastic resin bodies having wrinkled cell walls and being highly resistant to breaking upon bending.

It is a still further object of the present invention to provide a process of forming new cellular thermoplastic resin bodies wherein the cell walls thereof are wrinkled thereby giving a high extensibility to said bodies.

Other objects and advantages of the present invention will be apparent from a further reading of the specification and of the appended claims.

With the above objects in view, the present invention mainly consists in a process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure, subjecting the cellular thermoplastic resin body at at least atmospheric pressure at a raised temperature below the temperature at which the thermoplastic resin body starts to flow to an atmosphere consisting at least partly of vapor which is liquid at room temperature and vapor at the raised temperature so as to cause the vapor and the gas in the cells to diffuse through the gas-permeable cell walls so that the vapor at least partially replaces the gas in the closed cells without expansion of the cells, thereby forming a closed-cell cellular thermoplastic resin body containing the closed cells the vapor and having a gas pressure including the pressure due to the vapor at least equal to atmospheric pressure, and cooling the thus formed cellular thermoplastic resin body containing vapor in the closed cells thereof so as to cause the vapor to condense, thereby reducing the pressure in the closed cells causing the closed cells to partially collapse and the cell walls to become wrinkled.

Closed-cell, gas-expanded cellular thermoplastic resin bodies when formed in the customary manner, have spherical or polyhedric-shaped cells. Such cellular bodies are treated according to the present invention to cause the gas pressure therein to be reduced to below atmospheric pressure which thereby causes the cell walls to become wrinkled upon exposure of the body to the atmosphere due to the pressure of the atmosphere on the cell walls. The extent to which the cell walls are wrinkled depends, of course, upon the extent to which the pressure in the cells is reduced.

The gas-expanded thermoplastic resin bodies having closed cells containing gas at at least atmospheric pressure may be formed in any customary manner. Generally, gas is forced into a thermoplastic mass under pressure and the thermoplastic mass containing the gas is heated causing the same to expand and form the cellular body. Such cellular bodies will always have the gas in the cells at at least atmospheric pressure and the cells will always be either spherical or polyhedric in shape. The cellular bodies of the present invention having wrinkled cell walls are irregular in shape and have been found to have extremely good bendability, the same being highly resistant to breaking upon bending.

The cell walls of the cellular bodies produced according to the process of the present invention are herein described by the term "wrinkled." It is to be understood, of course, that these cell walls may also be described as having creases or folds.

These cellular bodies have been found to have greatly improved properties making these bodies suitable for a number of purposes. These bodies have a much higher extensibility and bendability than the ordinary cellular bodies made of the same raw material. In fact, it has been found that these cellular bodies are 10 to 20 times more resistant to breaking upon bending than cellular bodies of the same raw materials formed according to the usual processes which do not produce wrinkled cell walls. These cellular bodies have a higher resistance to breaking upon bending at a bending angle of 90° than do rubber sheets of the same thickness.

The cellular bodies produced according to the process of the present invention are particularly suitable for the manufacture of shoe soles due to the properties of high extensibility and resistance to breaking upon bending. By the choice of the type and amount of plasticizer and/or the resin, it is possible to obtain the properties of good viscosity and resistance to abrasion as well as the other properties mentioned. The material obtained which can be used for shoe soles has a lower specific gravity (about 0.1-0.8) than sole material of equivalent properties made of any other type of material. Shoe soles made of this material have a very poor cold and heat conductivity and are therefore highly insulating. Soles made of these materials are particularly good in cold weather and are also impermeable to water and do not slip on slippery surfaces. Slipping is permanently prevented by the use of these materials as shoe soles because the wearing out of the outer layer cells causes new irregular cells to appear on the outer layer, these cells acting like small suction cups to prevent slipping.

As disclosed in our copending application Serial No. 318,576, now Patent No. 2,746,088, a preferred method of reducing the gas pressure in the closed cells of the ordinary cellular thermoplastic bodies having spherical or polyhedrical shaped cells comprises causing at least a portion of the gas contained in the cells to escape therefrom so that the gas pressure in the cells becomes less than atmospheric pressure and upon exposure to the atmosphere thereby causes the cellular body to shrink, the cells to partially collapse, and the cell walls to form wrinkles or folds therein. Of course, this also results in an increase in the specific gravity of the body.

The removal of the gas contained in the closed cells while maintaining the closed-cell cellular structure causes the gas to diffuse through the cell walls. Another method of lowering the gas pressure in the cells, and this application is mainly directed to this other method, is to at least partially fill the gas-containing cells with a vapor which condenses at room temperature and therefore upon exposure at room temperature the condensation of the vapor causes a reduction in the gas pressure in the cells, the atmospheric pressure causing the cells to collapse.

The temperature at which the original cellular thermoplastic resin body having spherical or polyhedric-shaped cells is subjected to the vapor-containing atmosphere is above room temperature and the vapor should be of a substance which is liquid at room temperature. The temperature utilized should always be below the temeperature at which the thermoplastic resin body starts to flow, i. e. below the "flowing temperature." The term "flowing temperature" is used to designate that temperature at which the thermoplastic resin starts to lose its shape, melt somewhat and creep together. Each thermoplastic resin has a different flowing temperature; the temperature at which any particular thermoplastic resin starts to flow can easily be determined by simple pre-testing. It is necessary to utilize a temperature below the flowing temperature of the thermoplastic resin in order to prevent a permanent deformation of the cellular body.

The method of the invention may be applied to other thermoplastic materials besides polyvinylchloride, such as copolymers of vinylchloride containing a major portion of copolymerized vinylchloride, mixtures of polyvinylchloride with other thermoplastic resins, polyvinyl butyrate, polyvinyl acetate, polyvinyl alcohol, polyvinyl acetals such as polyvinyl formal, polyvinyl butyral, etc., polyvinylidene chloride, copolymers of vinylidene chloride and vinylchloride, polyvinyl aromatic compounds such as polystyrene, polydichloro-styrene, polyalpha-methylstryrene, etc., and acrylic compounds such as polymethylacrylate, polyethylacrylate, polymethylmethacrylate, etc. The thermoplastic resins may be used with or without plasticizers.

The solvents which may be used include acetone, methylethyl ketone, ethyl acetate, etc. As illustrative of the plasticizers that may be used are the following: dioctylphthalate, dibutylphthalate, dimethylphthalate, tricresyl phosphate, etc. Any of these plasticizers or mixtures of them may be employed with the process.

The original cellular body may either be formed by forcing gas into the same from without the body, or by the use of a blowing agent.

An excellent blowing agent which may be used in the process is azoisobutyric dinitrile. Other nitrogen-producing blowing agents which may be used are alpha, alpha'-azobisiso butyronitrile, diazoaminobenzene, 1,3-bis-(p-xenyl)-triazene, etc. Nitrogen-producing blowing agents are preferred; however, blowing agents which produce other gases such as ammonia or carbon dioxide may be employed. Commonly used blowing agents which produce these gases are sodium bicarbonate and oleic acid, ammonium carbonate, mixtures of ammonium chloride and sodium nitrite, etc.

Figure 2:
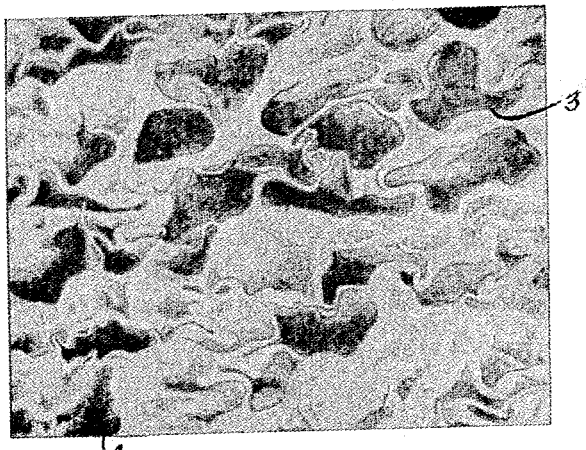

The cellular bodies which are produced in accordance with the method of the present invention may be best understood by the following description of the attached drawing, in which:

Fig. 1 is a cross-section of a cellular thermoplastic body having polyhydric cells and being prepared according to known processes; and Fig. 2 is a cross-section of a cellular thermoplastic body prepared according to the present invention and having wrinkled cell walls.

Referring now to the drawings and more particularly to Fig. 1, it is noted that the cell walls 1 are relatively smooth and the cells 2 have a substantially spherical shape. The cellular body of Fig. 1 of which the cross-section is taken is prepared according to the known processes without causing a shrinking of the cells and wrinkling of the cell walls.

Fig. 2, which is a cross-section of a cellular body prepared according to the process of the present invention indicates that the cell walls 3 are no longer smooth and regular and that the cells 4 are irregular and no longer have a substantially spherical shape.

The method of producing cellular bodies having wrinkled cell walls with which this application is mainly concerned by reducing the pressure in the cells to subatmospheric pressure comprises causing a portion of the gas in the closed cells to be replaced at a raised temperature by a vapor which is liquid at room temperature but is vapor at said raised temperature. Upon cooling, the vapor condenses, thereby reducing the gas pressure in the cells and causing the cells to collapse and the cell walls to become wrinkled.

The extent to which the pressure in the cells is lowered upon cooling depends upon the amount of vapor in the cells. The vapor is put in the cells by subjecting the original cellular bodies to an atmosphere at least partially consisting of the vapor so that diffusion causes the vapor in the atmosphere and the gas in the cells to be exchanged until an equilibrium is reached. Water vapor (steam) is highly satisfactory. Other substances which are liquid at room temperature and vaporize at sufficiently low temperatures so as to be suitable are organic solvents such as acetone, methylethylketone, etc.

The gas contained in the original cellular body is not of great importance, though, of course, light, quick-diffusing gases such as hydrogen and carbon dioxide or mixtures thereof facilitate the exchange of the gas in the cells with the vapor in the atmosphere.

The application of this method for the production of cellular bodies having wrinkled cell walls according to the present invention is accomplished by heating the ordinary cellular body having spherical or polyhedric-shaped cells in an atmosphere of the vapor at a temperature generally above the temperature at which the resin body starts to soften. For polyvinylchloride masses the softening point of the material is about 70° C. and sheets of this material are heated at a temperature of about 100–120° C.

The vapor-containing atmosphere may consist solely of the vapor or may consist of a mixture of the vapor with a gas such as nitrogen. If the vapor is steam the diffusion of the steam into the cells can be accomplished at a temperature of about 120° C. It is unnecessary to utilize a superatmospheric pressure. During the exchange by diffusion of vapor for the gas in the cells, the cells retain their substantially original shape and do not lose this shape until cooling and condensation of the vapor.

The exchange of vapor in the atmosphere with the gas in the cells takes a longer or shorter time depending upon the thickness of the body, the gas contained in the cells, etc. For sheets about 30 mm. thick the exchange by diffusion generally takes about 6 hours.

In the atmosphere of steam or other vapor, the sheet retains its normal appearance and the cells do not shrink or collapse, the cell walls remain even. As long as the temperature is above the softening point of the resin, the cellular bodies remain in tension-free condition. The cell contents consist substantially of steam.

By cooling the thus-treated cellular bodies, the steam condenses and the pressure in the cells is lowered so rapidly that there is no possibility of diffusion of air from the atmosphere, thereby causing the cellular body to shrink, the specific gravity to increase, the cells to collapse and the cell walls to become wrinkled. The resulting cellular body generally has a specific gravity of about 0.5–0.8.

The specific gravity of the thus produced cellular bodies having wrinkled cell walls can be regulated by controlling the amount of vapor in the atmosphere. It is obvious that the less air mixed with the vapor in the cells the greater the specific gravity of the resulting cellular bodies and the more air mixed with the vapor in the cells the lower the specific gravity and the less the cell walls become wrinkled.

In accordance with the present invention, a cellular body which may be produced in any normal manner is preferably cut into sheets, e. g. of a thickness of about 10–40 mm. These sheets of the cellular body are then subjected to an atmosphere of a vapor which is liquid at room temperature but is in vapor state at the treating temperature, e. g. to an atmosphere of steam at a temperature of 120° C. The vapor atmosphere may be at normal pressure, though the pressure may conveniently be raised ½ to 1 atmosphere. Such treatment causes the gas in the cells to diffuse out of the cells and the vapor into the cells. Upon cooling, the vapor condenses resulting in a decrease of volume of the gas and the formation of a sub-atmospheric pressure in the cells which results in collapse of the cells and a wrinkling of the cell walls.

The following are given as examples of the present invention, the scope of the invention not, however, being limited thereto.

Example I

A mixture of 64 parts by weight well stabilized polyvinyl chloride, 24 parts by weight dioctylphthalate and 12 parts by weight dibutylphthalate are mixed with 20 parts methylethylketone to form a loose powder. The powder is treated with hydrogen under pressure and upon release of the pressure and expansion the cellular body thus produced has a specific gravity of about 0.06. The cellular body is cut into sheets about 15 mm. thick and subjected to an atmosphere of superheated steam at a temperature of about 120° C. The steam is maintained at atmospheric pressure or slightly higher. During this treatment the hydrogen diffuses out of the cells and the steam into the cells. After about one-half to three hours the exchange of the gas and vapor is substantially complete. Upon cooling to room temperature the steam condenses resulting in a decrease in volume of the gas and a negative pressure (below atmospheric pressure) being formed in the cells. The cells therefore collapse and the cell walls become wrinkled. The resulting cellular body has a specific gravity of about 0.5–0.6 and a high tensile strength and resistance to breaking upon bending.

Example II

A mixture of 64 parts by weight well stabilized polyvinyl chloride, 36 parts by weight dioctylphthalate, and 20 parts acetone are mixed to form a loose powder. The powder is treated in the customary manner with hydrogen under pressure and upon expansion a cellular body is formed having a specific gravity of about 0.08.

The cellular body is cut into sheets of about 15 mm. thickness and these sheets are well moistened with acetone. The sheets are then subjected to an atmosphere of nitrogen and acetone vapor for a period of about 1–3 hours. The acetone vapor in the cells brought therein by this treatment condenses upon cooling resulting in a reduction of pressure in the cells, thereby causing the cells to collapse and the cell walls to become wrinkled. The specific gravity of the resulting cellular body is about 0.5.

The above example could also be carried out using a mixed polymerisate of 95% vinyl chloride and 5% vinyl acetate, 66 parts of this mixed polymerisate being mixed with 34 parts dioctylphthalate and 20 parts acetone. After expansion the resulting cellular body has a specific gravity of 0.09 and after treatment to cause the cell walls to become wrinkled the resulting cellular body has a specific gravity of about 0.6.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; subjecting said cellular thermoplastic resin body at at least atmospheric pressure at a raised temperature below the temperature at which said thermoplastic resin body starts to flow to an atmosphere consisting at least partly of vapor which is liquid at room temperature and vapor at said raised temperature so as to cause said vapor and the gas in said cells to diffuse through the gas-permeable cell walls so that said vapor at least partially replaces the gas in said closed cells without expansion of said cells, thereby forming a closed-cell cellular thermoplastic resin body containing in said closed cells said vapor and having a gas pressure including the pressure due to said vapor at least equal to atmospheric pressure; and cooling the thus formed cellular thermoplastic resin body containing vapor in the closed cells thereof so as to cause said vapor to condense, thereby reducing the pressure in said closed cells causing said closed cells to partially collapse and the cell walls to become wrinkled.

2. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; subjecting said cellular thermoplastic resin body at at least atmospheric pressure at a raised temperature below the temperature at which said thermoplastic resin body starts to flow to an atmosphere consisting at least partly of water vapor which is liquid at room temperature and vapor at said raised temperature so as to cause said water vapor and the gas in said cells to diffuse through the gas-permeable cell walls so that said water vapor at least partially replaces the gas in said closed cells without expansion of said cells, thereby forming a closed-cell cellular thermoplastic resin body containing in said closed cells said water vapor and having a gas pressure including the pressure due to said water vapor at least equal to atmospheric pressure; and cooling the thus formed cellular thermoplastic resin body containing water vapor in the closed cells thereof so as to cause said water vapor to condense, thereby reducing the pressure in said closed cells causing said closed cells to partially collapse and the cell walls to become wrinked.

3. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; subjecting said cellular thermoplastic resin body at at least atmospheric pressure at a raised temperature below the temperature at which said thermoplastic resin body starts to flow to an atmosphere consisting at least partly of acetone vapor which is liquid at room temperature and vapor at said raised temperature so as to cause said acetone vapor and the gas in said cells to diffuse through the gas-permeable cell walls so that said acetone vapor at least partially replaces the gas in said closed cells without expansion of said cells, thereby forming a closed-cell cellular thermoplastic resin body containing in said closed cells said acetone vapor and having a gas pressure including the pressure due to said acetone vapor at least equal to atmospheric pressure; and cooling the thus formed cellular thermoplastic resin body containing acetone vapor in the closed cells thereof so as to cause said acetone vapor to condense, thereby reducing the pressure in said closed cells causing said closed cells to partially collapse and the cell walls to become wrinkled, 4. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; removing the outer crust of said cellular thermoplastic resin body; subjecting said cellular thermoplastic resin body having the outer crust thereof removed at at least atmospheric pressure at a raised temperature below the temperature at which said thermoplastic resin body starts to flow to an atmosphere consisting at least partly of vapor which is liquid at room temperature and vapor at said raised temperature so as to cause said vapor and the gas in said cells to diffuse through the gas-permeable cell walls so that said vapor at least partially replaces the gas in said closed cells without expansion of said cells, thereby forming a closed-cell cellular thermoplastic resin body containing in said closed cells said vapor and having a gas pressure including the pressure due to said vapor at least equal to atmospheric pressure; and cooling the thus formed cellular thermoplastic resin body containing vapor in the closed cells thereof so as to cause said vapor to condense, thereby reducing the pressure in said closed cells causing said closed cells to partially collapse and the cell walls to become wrinkled.

5. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; slicing said cellular thermoplastic resin body into thin sheets of the same; subjecting said thin sheets of said cellular thermoplastic resin body at at least atmospheric pressure at a raised temperature below the temperature at which said thermoplastic resin body starts to flow to an atmosphere consisting at least partly of vapor which is liquid at room temperature and vapor at said raised temperature so as to cause said vapor and the gas in said cells to diffuse through the gas-permeable cell walls so that said vapor at least partially replaces the gas in said closed cells without expansion of said cells, thereby forming thin sheets of a closed-cell cellular thermoplastic resin body containing in said closed cells said vapor and having a gas pressure including the pressure due to said vapor at least equal to atmospheric pressure; and cooling the thus formed cellular thermoplastic resin body containing vapor in the closed cells thereof so as to cause said vapor to condense, thereby reducing the pressure in said closed cells causing said closed cells to partially collapse and the cell walls to become wrinkled.

6. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; slicing said cellular thermoplastic resin body into thin sheets of the same having a thickness of 10–40 mm.; subjecting said thin sheets of said cellular thermoplastic resin body at at least atmospheric pressure at a raised temperature below the temperature at which said thermoplastic resin body starts to flow to an atmosphere consisting at least partly of vapor which is liquid at room temperature and vapor at said raised temperature so as to cause said vapor and the gas in said cells to diffuse through the gas-permeable cell walls so that said vapor at least partially replaces the gas in said closed cells without expansion of said cells, thereby forming thin sheets of a closed-cell cellular thermoplastic resin body containing in said closed cells said vapor and having a gas pressure including the pressure due to said vapor at least equal to atmospheric pressure; and cooling the thus formed cellular thermoplastic resin body containing vapor in the closed cells thereof so as to cause said vapor to condense, thereby reducing the pressure in said closed cells causing said closed cells to partially collapse and the cell walls to become wrinkled.

7. A process of producing a closed-cell cellular thermoplastic resin article having wrinkled cell walls, comprising the steps of forming a gas-expanded cellular thermoplastic resin body consisting at least partly of polyvinyl chloride having closed gas-permeable cells containing gas at a pressure at least equal to atmospheric pressure; subjecting said cellular thermoplastic resin body at at least atmospheric pressure at a raised temperature below the temperature at which said thermoplastic resin body starts to flow to an atmosphere consisting at least partly of a vapor which is liquid at room temperature and vapor at said raised temperature so as to cause said vapor and the gas in said cells to diffuse through the gas-permeable cell walls so that said vapor at least partially replaces the gas in said closed cells without expansion of said cells, thereby forming a closed-cell cellular thermoplastic resin body containing in said closed cells said vapor and having a gas pressure including the pressure due to said vapor at least equal to atmospheric pressure; and cooling the thus formed cellular thermoplastic resin body containing vapor in the closed cells thereof so as to cause said vapor to condense, thereby reducing the pressure in said closed cells causing said closed cells to partially collapse and the cell walls to become wrinkled.

8. A process of producing a closed-cell cellular thermoplastic resin article having wrinkled cell walls, comprising the steps of forming a gas-expanded cellular thermoplastic resin body having closed gas-permeable cells containing nitrogen gas at a pressure at least equal to atmospheric pressure; subjecting said cellular thermoplastic resin body at at least atmospheric pressure at a raised temperature below the temperature at which said thermoplastic resin body starts to flow to an atmosphere consisting at least partly of vapor which is liquid at room temperature and vapor at said raised temperature so as to cause said vapor and the nitrogen gas in said cells to diffuse through the gas-permeable cell walls so that said vapor at least partially replaces the nitrogen gas in said closed cells without expansion of said cells, thereby forming a closed-cell cellular thermoplastic resin body containing in said closed cells said vapor and having a gas pressure including the pressure due to said vapor at least equal to atmospheric pressure; and cooling the thus formed cellular thermoplastic resin body containing vapor in the closed cells thereof so as to cause said vapor to condense, thereby reducing the pressure in said closed cells causing said closed cells to partially collapse and the cell walls to become wrinkled.

9. A process of producing a closed-cell cellular thermoplastic resin article having wrinkled cell walls, comprising the steps of forming a gas-expanded cellular thermoplastic resin body having closed gas-permeable cells containing a mixture of nitrogen and hydrogen gas at a pressure at least equal to atmospheric pressure; subjecting said cellular thermoplastic resin body at at least atmospheric pressure at a raised temperature below the temperature at which said thermoplastic resin body starts to flow to an atmosphere consisting at least partly of vapor which is liquid at room temperature and vapor at said raised temperature so as to cause said vapor and the nitrogen and hydrogen gas in said cells to diffuse through the gas-permeable cell walls so that said vapor at least partially replaces the nitrogen and hydrogen gas in said closed cells without expansion of said cells, thereby forming a closed-cell cellular thermoplastic resin body containing in said closed cells said vapor and having a gas pressure including the pressure due to said vapor at least equal to atmospheric pressure; and cooling the thus formed cellular thermoplastic resin body containing vapor in the closed cells thereof so as to cause said vapor to condense, thereby reducing the pressure in said closed cells causing said closed cells to partially collapse and the cell walls to become wrinkled.

10. A process of producing a closed-cell cellular thermoplastic resin article having wrinkled cell walls, comprising the steps of forming a gas-expanded cellular thermoplastic resin body having closed gas-permeable cells containing a mixture of nitrogen and hydrogen gas at a pressure at least equal to atmospheric pressure; subjecting said cellular thermoplastic resin body at at least atmospheric pressure at a raised temperature below the temperature at which said thermoplastic resin body starts to flow to an atmosphere consisting at least partly of water vapor which is liquid at room temperature and vapor at said raised temperature so as to cause said water vapor and the nitrogen and hydrogen gas in said cells to diffuse through the gas-permeable cell walls so that said water vapor at least partially replaces the nitrogen and hydrogen gas in said closed cells without expansion of said cells, thereby forming a closed-cell cellular thermoplastic resin body containing in said closed cells said water vapor and having a gas pressure including the pressure due to said water vapor at least equal to atmospheric pressure; and cooling the thus formed cellular thermoplastic resin body containing water vapor in the closed cells thereof so as to cause said water vapor to condense, thereby reducing the pressure in said closed cells causing said closed cells to partially collapse and the cell walls to become wrinkled.

References Cited in the file of this patent

UNITED STATES PATENTS

| | | |
|---|---|---|
| 2,525,966 | Smith et al. | Oct. 17, 1950 |
| 2,697,255 | Lindemann | Dec. 21, 1954 |
| 2,746,088 | Lindemann et al. | May 22, 1956 |